(12) United States Patent
Arlt et al.

(10) Patent No.: US 9,963,005 B2
(45) Date of Patent: May 8, 2018

(54) MOUNTABLE HITCH FRAME ASSEMBLY FOR THREE-WHEELED VEHICLE

(71) Applicants: Richard Douglas Arlt, Ellensburg, WA (US); Walter Harvey Arlt, Ellensburg, WA (US)

(72) Inventors: Richard Douglas Arlt, Ellensburg, WA (US); Walter Harvey Arlt, Ellensburg, WA (US)

( * ) Notice: Subject to any disclaimer, the term of this patent is extended or adjusted under 35 U.S.C. 154(b) by 0 days. days.

(21) Appl. No.: 15/421,713

(22) Filed: Feb. 1, 2017

(65) Prior Publication Data
US 2017/0217269 A1    Aug. 3, 2017

Related U.S. Application Data

(60) Provisional application No. 62/289,418, filed on Feb. 1, 2016.

(51) Int. Cl.
| | |
|---|---|
| *B60D 1/52* | (2006.01) |
| *B60R 9/06* | (2006.01) |
| *B62K 5/00* | (2013.01) |
| *B60D 1/00* | (2006.01) |

(52) U.S. Cl.
CPC ............... *B60D 1/52* (2013.01); *B60R 9/06* (2013.01); *B62K 5/00* (2013.01); *B60D 2001/003* (2013.01)

(58) Field of Classification Search
CPC ....................................... B60D 1/52
See application file for complete search history.

(56) References Cited

U.S. PATENT DOCUMENTS

| | | | |
|---|---|---|---|
| 8,328,223 B2 * | 12/2012 | Leinenger | B60D 1/04 280/416.1 |
| 2010/0213688 A1 * | 8/2010 | Kuzara | B60D 1/52 280/495 |

* cited by examiner

*Primary Examiner* — Kevin Hurley
(74) *Attorney, Agent, or Firm* — Williams Intellectual Property; Benjamin F. Williams

(57) ABSTRACT

A mountable hitch frame assembly for three-wheeled vehicle that secures to the rear portion of an existing three-wheeled vehicle frame to position a hitch receiver assembly rearwardly projected overtop a rear swing arm assembly of the existing three-wheeled vehicle whereby objects and accouterments are mountable securely in tow and force and inertia exerted when towing objects and accouterments is distributable directly into the existing three-wheeled vehicle frame.

13 Claims, 10 Drawing Sheets

MOUNTABLE HITCH FRAME ASSEMBLY FOR THREE-WHEELED VEHICLE

CROSS-REFERENCE TO RELATED APPLICATIONS

This nonprovisional application claims the benefit of provisional application No. 62/289,418 filed Feb. 1, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of hitch assemblies usable with three-wheeled vehicles and motorcycles are known in the art. However, most attach to the swing arm assembly of a rear wheel, or to the axle around the rear wheel, and thus distribute weight and force through the wheel assembly rather than directly to the vehicle's frame. Worse, such hitch assemblies can distribute weight in such a way as to compress the swing arm laterally, or throw the vehicle off balance during towing.

What is needed is a mountable hitch frame assembly for three-wheeled vehicle that is securable directly to a vehicle frame to position a hitch mount above a rear wheel, whereby an existing three-wheeled vehicle is transformable to enable secure transport of objects in tow without impeding the normal operation of the vehicle.

The present invention, therefore, has been devised to mount directly to the frame of a three-wheeled vehicle, such as a side by side reverse trike for example, wherein a trigon frame member anterior end is securable to existing fastenings disposed upon said vehicle frame and expedient conversion of the three-wheeled vehicle to support towing capabilities is enabled. The trigon frame member thus securably disposes a hitch receiver assembly rearwardly projected over a single rear wheel wherein weight and force engendered while towing an object are directly distributable to the vehicle frame, whereby a side by side reverse trike is enabled towing capabilities.

FIELD OF THE INVENTION

The present mountable hitch frame assembly for three-wheeled vehicle has been devised for use with a three-wheeled vehicle, such as a side by side reverse trike for example, as disclosed in U.S. Pat. No. 8,544,587, U.S. Pat. No. 8,695,746, U.S. Pat. No. 9,004,214, and patent publication numbers, US2012/0241237, US2012/0241238, US2012/0241239, for example, and set forth as a three-wheeled vehicle also known in the art as a "side by side reverse trike".

The present invention seats a trigon frame member into a rear frame portion of a three-wheeled vehicle and is securely disposed thereat by securable interconnection of a central securement plate around a support rear cross tube of the vehicle frame and by further connection of each of an attachment portion, disposed endwise upon each of a pair of side support members, to the vehicle frame proper where each of a pair of retractable seatbelt housings is securably disposed.

The present invention thus makes use of existing frame mounts integral to the chassis of a three-wheeled vehicle to securably dispose a trigon frame member nested within a rear frame portion of the vehicle, wherein a hitch receiver assembly is rearwardly projected over a single rear wheel and replacement of an existing cowling disposed to cover the rear frame portion encapsulates said trigon frame member from view. The present mountable hitch frame assembly for three-wheeled vehicle, therefore, enables expedient transformation of a three-wheeled vehicle into a three-wheeled vehicle capable of securably transporting objects in tow.

SUMMARY OF THE INVENTION

The general purpose of the mountable hitch frame assembly for three-wheeled vehicle, described subsequently in greater detail, is to provide a mountable hitch frame assembly for three-wheeled vehicle which has many novel features that result in a mountable hitch frame assembly for three-wheeled vehicle which is not anticipated, rendered obvious, suggested, or even implied by prior art, either alone or in combination thereof.

The present mountable hitch frame assembly for three-wheeled vehicle has been devised to enable ready conversion of a preexisting three-wheeled vehicle, such as a side by side reverse trike for example, to enable secure transportation of objects in tow. The present mountable hitch frame assembly for three-wheeled vehicle is devised for installation secured direct to the vehicle chassis to securably house a hitch receiver assembly above a single rear wheel, whereby the height of a connected hitch mount is adjustable and weight and force engendered during towing are directly distributable into the vehicle chassis without interfering appreciably with the normal operation of the vehicle.

The terms "rear frame portion" and "support rear cross tube" as applied to an existing three-wheeled vehicle chassis are taken to include the meanings set forth in U.S. Pat. No. 8,544,587. Additional meanings are intended, however, to include frame elements and parts of chassis as may be appropriate for similar endeavor, as recognizable by one having ordinary skill in the art. Although the present invention is directed chiefly for use with a side by side reverse trike, such as set forth in the above referenced patents and patent publications, it is to be understood by anyone having ordinary skill in the art that the particular inventive departure over known prior art, as set forth herein, may be applicable in a mode of usages with motorcycles, three-wheeled vehicles, and other vehicles making use of such frame elements as may be adaptable for use herewith.

The present mountable hitch frame assembly for three-wheeled vehicle, therefore, includes a trigon frame member devised for fit within the bounds of a rear frame portion of an existing three-wheeled vehicle. The trigon frame member is devised to fit beneath the rear cowling of the vehicle when attached, whereby the trigon frame member is concealable from view and the aesthetic, line, and aerodynamics of the vehicle remain unaffected.

The trigon frame member includes an anterior end and a posterior end. The anterior end is securable directly to the vehicle frame, as will be described subsequently, and the posterior end is adapted for interconnection with a hitch receiver assembly adapted for use with the present invention.

A vertically disposed interconnect truss apex is disposed at the posterior end. The interconnect truss apex incudes a pair of parallel plate members, vertically disposed adjacent one another. A dorsal plate member disposed upon the hitch receiver assembly is insertible in between each of said pair of parallel plate members for securable engagement when any two of a plurality of apertures disposed in the dorsal plate member are aligned with a proximal and distal aperture disposed upon the interconnect truss apex and a fastener is applied therethrough. The dorsal plate member thus secures to the posterior end of the trigon frame member, and the hitch receiver assembly is disposed rearwardly projected beneath the posterior end and over the vehicle rear wheel for securable engagement with an object in tow.

Each of a pair of side support members is disposed divergently from the interconnect truss apex to form parallel sections extending an associated attachment portion anteriorly therefrom. Each attachment portion is disposed for securable connection to a vehicle frame. In the example embodiment contemplated herein, each attachment portion is spaced appropriately upon the trigon frame member to releasably secure to preexisting mounts disposed upon the vehicle frame whereat each of a pair of retractable seatbelt housings is securably attachable.

A medial support member is disposed horizontally frontwards from the interconnect truss apex. In an example embodiment set forth herein, the medial support member is parallelepiped and disposed in horizontal orientation between the posterior and anterior ends. The medial support member includes a horizontal section and an inclined section, said inclined section declining a central securement plate angled beneath the major longitudinal axis of the trigon frame member.

The central securement plate includes a plurality of apertures wherethrough each of a pair of bracket members is securable adjacently disposed in parallel underneath the central securement plate. Each of the pair of bracket members is securable engaged around a support rear cross tube of the vehicle frame rearwards of the seating of said vehicle. Thus the anterior end of the trigon frame member is securable to an existing vehicle frame.

At least one dorsal gusset member is disposed vertically upon the medial support member inclined section. The at least one dorsal gusset member terminates apically at an anterior pivotal housing, through which anterior pivotal housing an adjustable truss rod is angularly and rotatably disposed. The adjustable truss rod is threadably engaged interior to the anterior pivotal housing, extends angularly down toward the medial support member, and terminates atop the interconnect truss apex at a posterior pivotal terminus. Rotational engagement of the adjustable truss rod threadably engaged at the anterior pivotal housing and the posterior pivotal terminus therefore enables upward and downward play of the interconnect truss apex whereby the above-ground height of a hitch mount interconnected therewith is adjustable to accommodate various loads.

Thus has been broadly outlined the more important features of the present mountable hitch frame assembly for three-wheeled vehicle so that the detailed description thereof that follows may be better understood and in order that the present contribution to the art may be better appreciated.

For better understanding of the mountable hitch frame assembly for three-wheeled vehicle, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
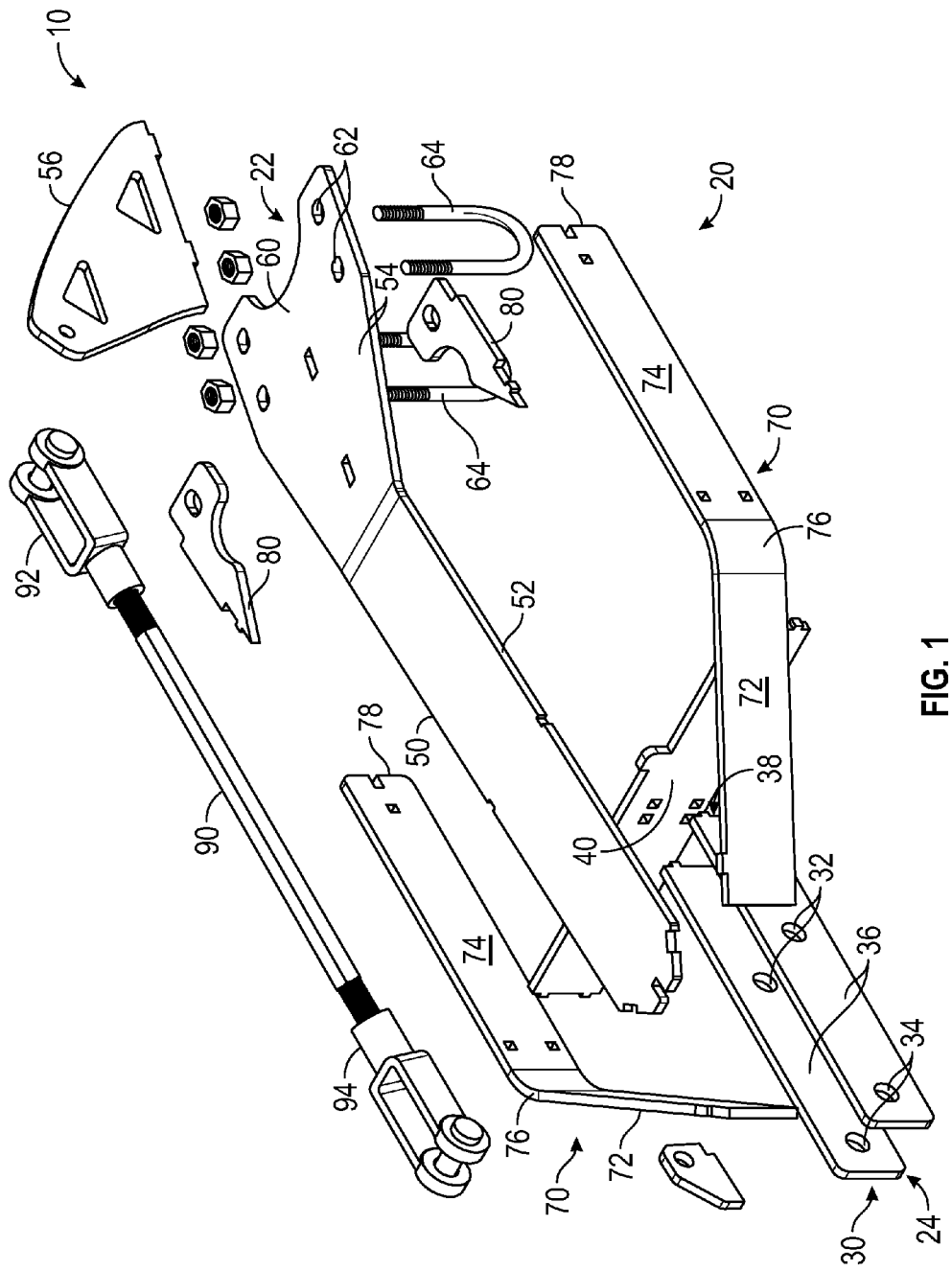
FIG. 1 is an exploded view of an example embodiment of a trigon frame member.
Figure 2:
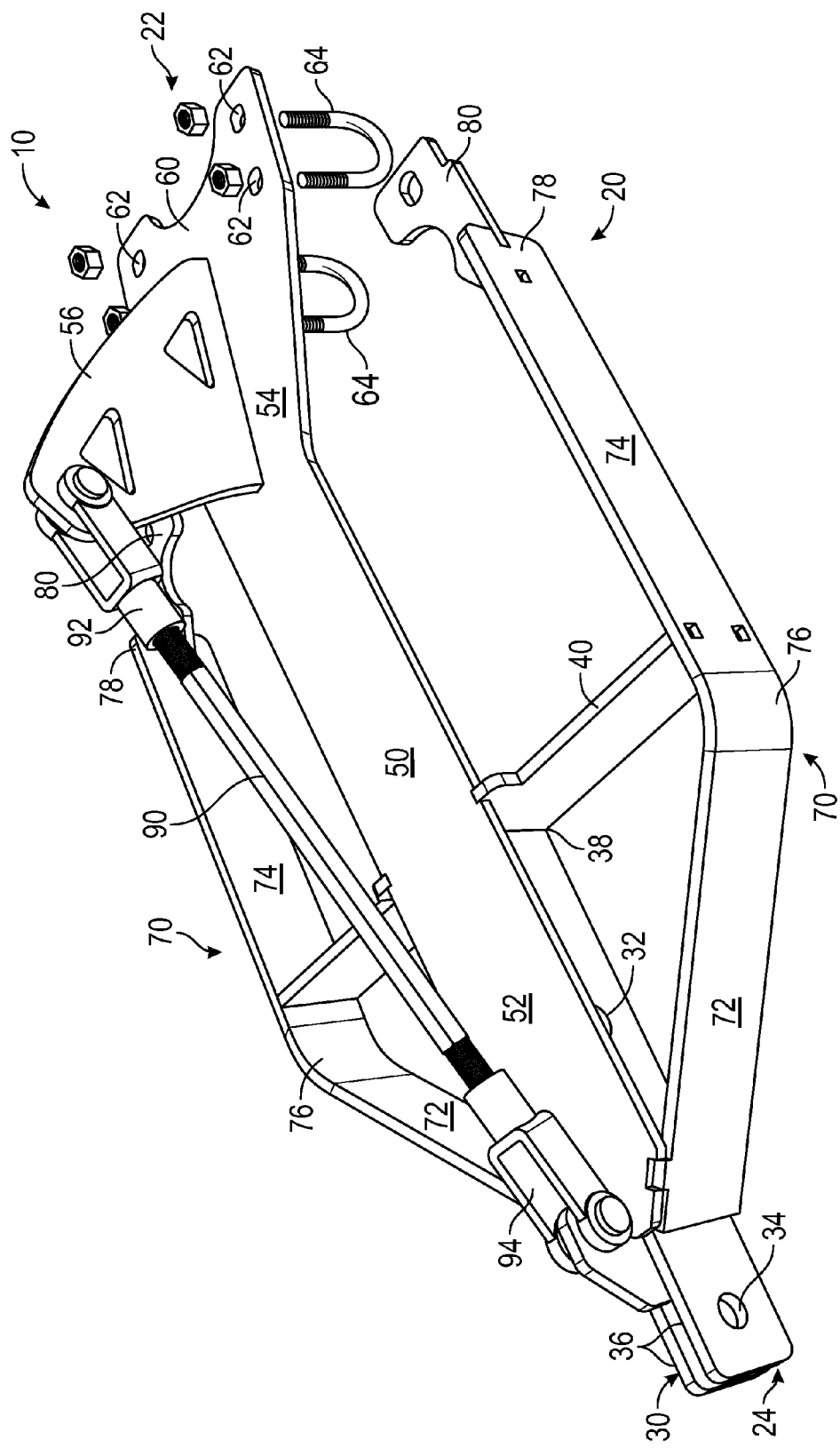
FIG. 2 is an isometric view of an example embodiment of a trigon frame member.
Figure 3:
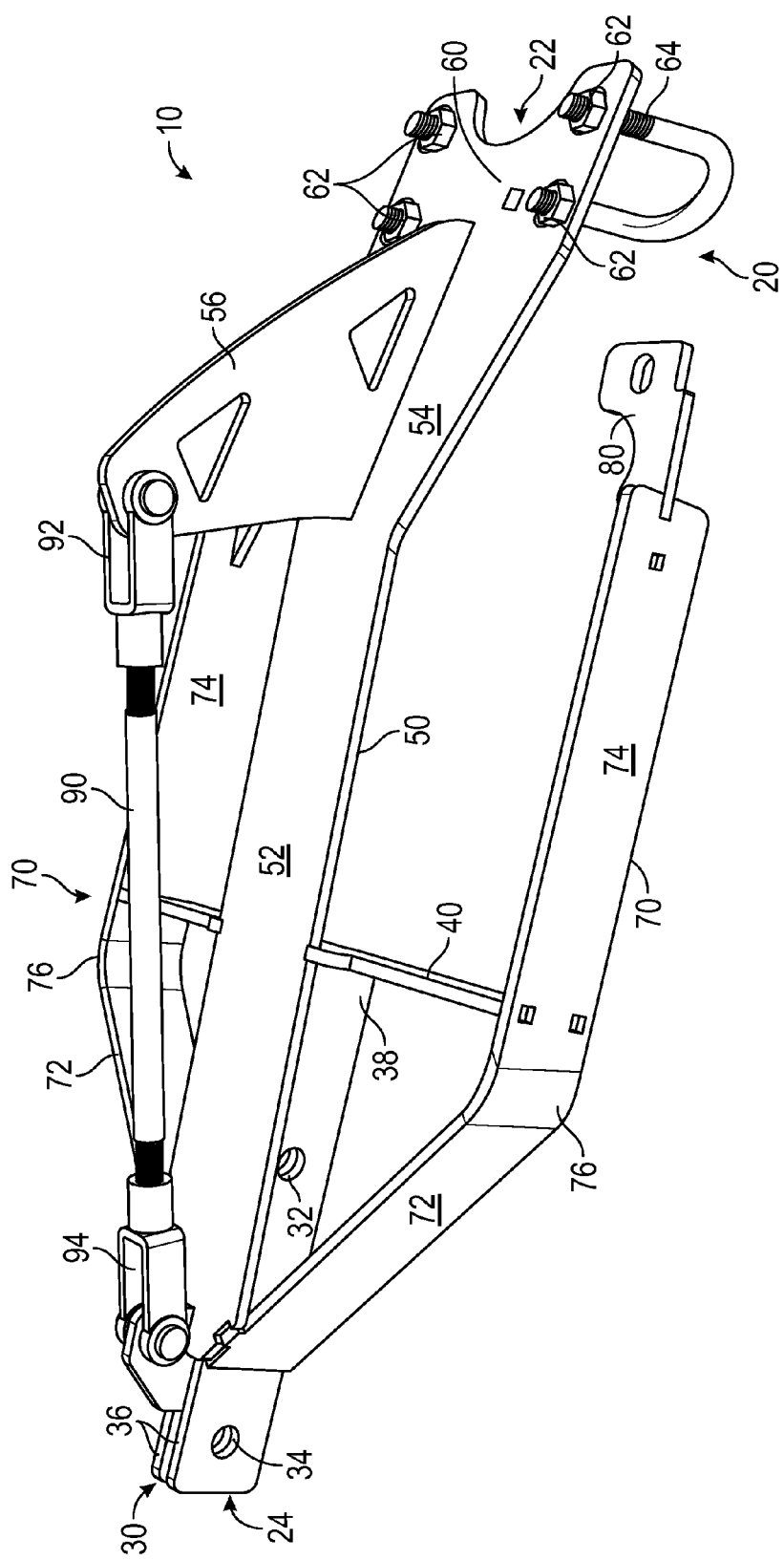
FIG. 3 is a side elevation view of a trigon frame member.
Figure 4:
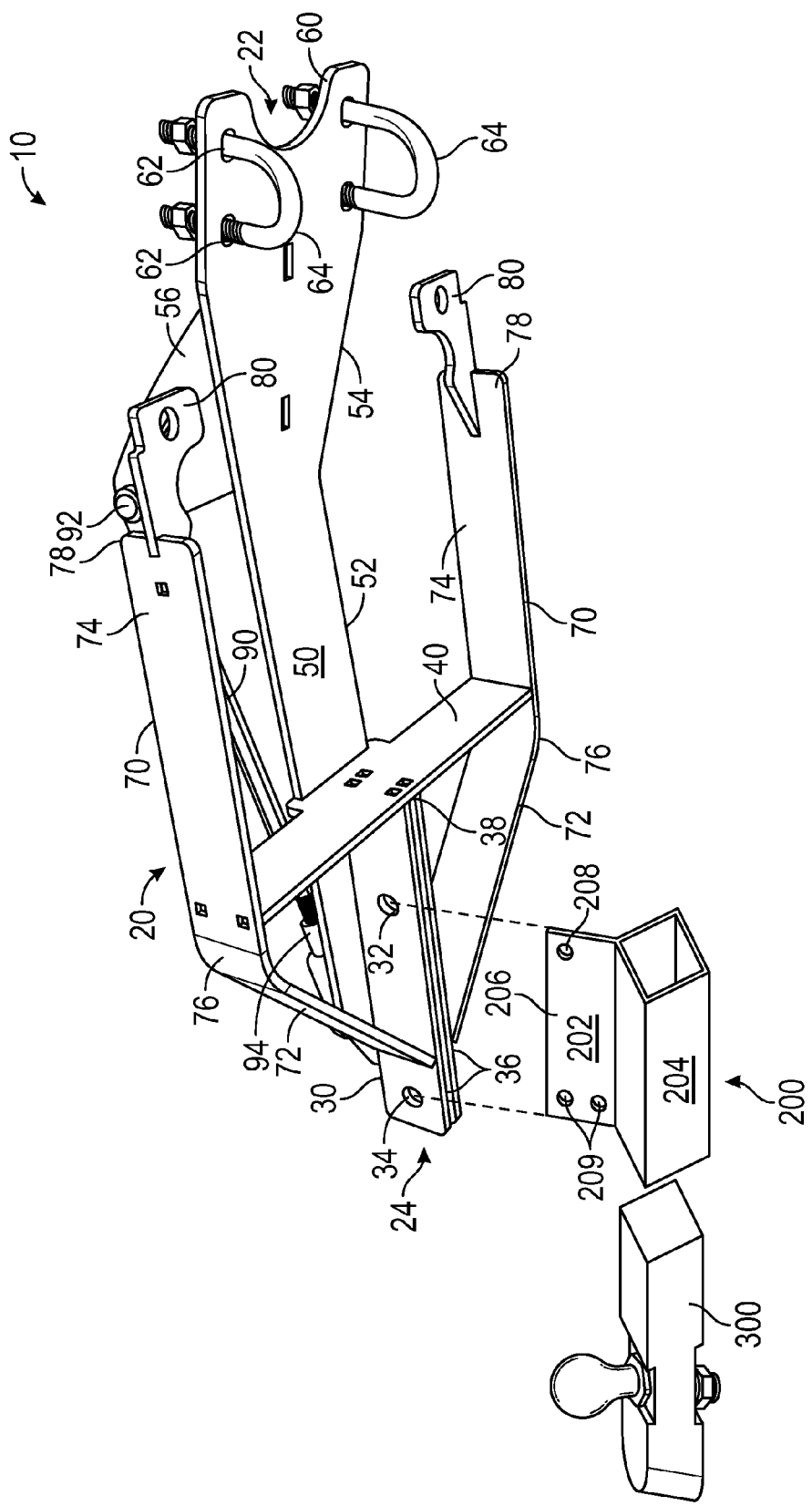
FIG. 4 is side elevation view of an example embodiment of a trigon frame member having a hitch receiver assembly attached at a posterior end.
Figure 5:
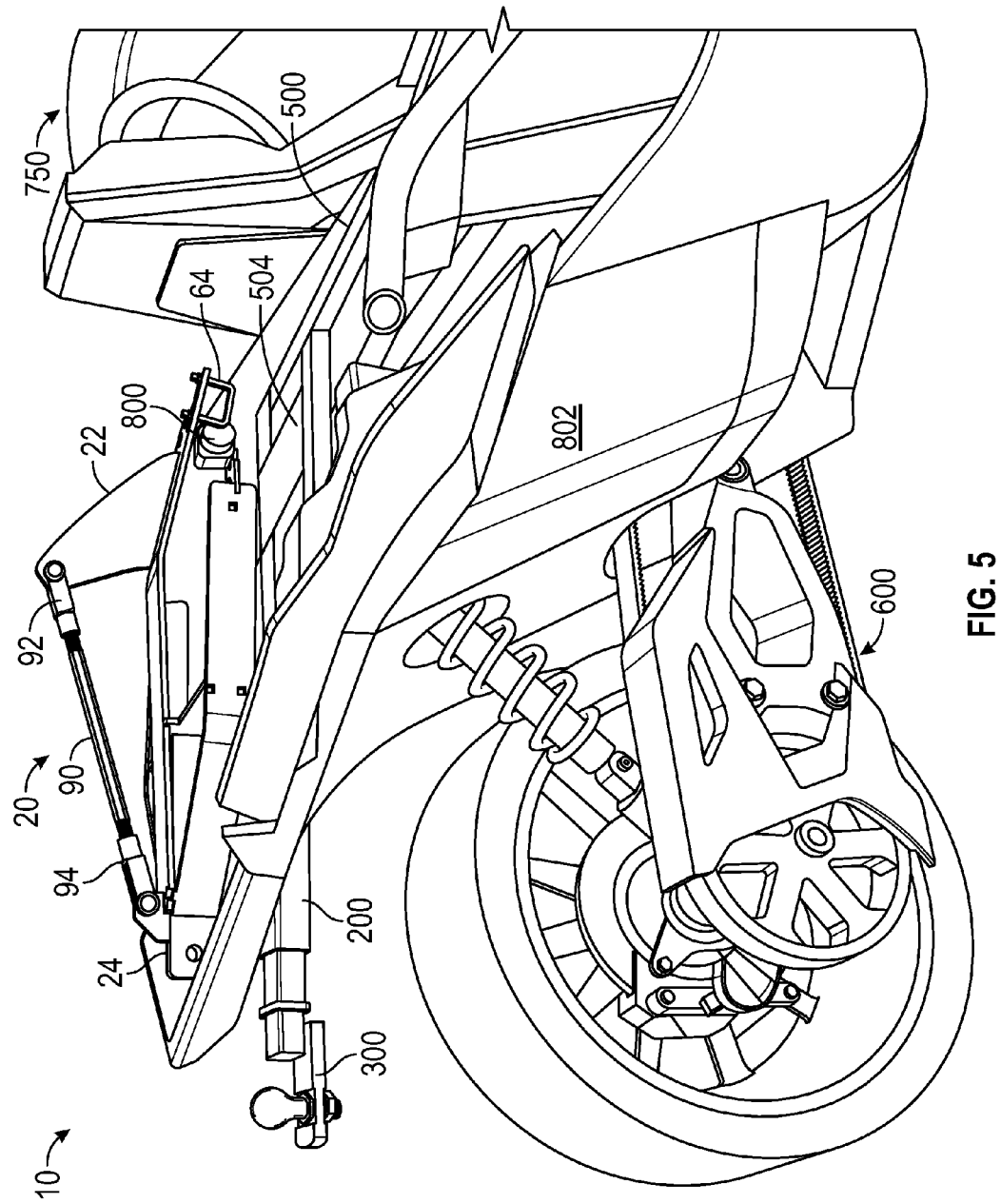
FIG. 5 is a side elevation view of an example embodiment of a trigon frame member installed to the frame of a three-wheeled vehicle.

With reference now to the drawings, and in particular FIGS. 1 through 10 thereof, example of the instant mountable hitch frame assembly for three-wheeled vehicle employing the principles and concepts of the present mountable hitch frame assembly for three-wheeled vehicle and generally designated by the reference number 10 will be described.

Referring to FIGS. 1 through 10 an example embodiment of the mountable hitch frame assembly for three-wheeled vehicle 10 is shown.

The present mountable hitch frame assembly for three-wheeled vehicle 10 has been devised to securably mount to the frame 500 of a three wheeled vehicle 750, such as a side by side reverse trike for example, and thereat securably position a trigon frame member 20 posteriorly disposed wherein a hitch receiver assembly 200 is securable projected rearward of said vehicle 750, whereby interconnection of a hitch mount 300 is enabled for towing trailers and the like.

In the example embodiment depicted herein, the instant mountable hitch frame assembly for three-wheeled vehicle 10 secures directly to the vehicle frame 500 of an existing three-wheeled vehicle 750, herein a side by side single rear wheel trike (or "reverse trike"). The instant mountable hitch frame assembly for three-wheeled vehicle 10, therefore, includes a trigon frame member 20 disposed for connection above the rear swing-arm assembly 600 of the vehicle frame 750, wherein a hitch receiver assembly 200 is securably projected rearwardly overtop the single rear wheel 750. In the example embodiment herein depicted, the trigon frame member 20 is disposed to seat into an existing rear frame portion 502 of the vehicle frame 500, effective by direct attachment to preexisting bolt holes rendered for securement of retractable seatbelt housings 800. The trigon frame member 20 thus expediently installs to preexisting frame mounts available in manufactured vehicles to distribute weight of connected trailers and other towed objects through the vehicle frame proper. Further, in the example embodiment herein depicted, the trigon frame member 20 is devised with dimensions appropriate that the vehicle rear cowling (not shown), disposed to cover the rear frame portion 502 for aesthetic, line, and aerodynamic concerns, also encapsulates said trigon frame member 20 when installed to the vehicle 750, whereby the trigon frame member 20 is concealable from view.

Discussing now the trigon frame member 20 proper, the trigon frame member 20 includes an anterior end 22 and a posterior end 24. The posterior end 24 includes a vertically disposed interconnect truss apex 30, having proximal and distal connection apertures 32, 34 disposed to accommodate hitch receiver assembly 200 dorsal plate member 202 when interconnected thereto. The vertically disposed interconnect truss apex 30 includes a pair of parallel plate members 36 vertically disposed longitudinally adjacent each other between said interconnect truss apex 30 and terminus 38 disposed conjunct transverse support member 40. A medial support member 50 overlies each of the pair of parallel plate members 36 conjoined along a common longitudinal axis thereatop, and projects a central securement plate 60 anteriorly frontwards of the transverse support member 40. Each of an opposing pair of side support members 70 is disposed angularly divergent from the interconnect truss apex 30 along an associated angled section 72 disposed between the truss apex 30 and the transverse support member 40. Each of the opposing pair of side support members 70 further includes a parallel section 74 disposed anteriorly at a primary bend 76 proximal an associated end of the transverse support member 40, each said parallel sections 74 disposed longitudinally in parallel with the medial support member 50, and endwise bounding the transverse support member 40, frontwards to terminus 78 laterally proximal the central securement plate 60. Transverse support member 40 thus underlies the medial support member 50 and connects the pair of side support members 70, the medial support member 50, and the pair of parallel plate members 36 of the truss apex 30.

Each of the pair of side support members 70 includes an attachment portion 80 at each respective terminus 78. The attachment portion 80 is disposed to connect to the frame 500 of the vehicle 750 in question. Each of the attachment portions 80 is fastenable to the vehicle frame 500 at a preexisting mount disposed in the vehicle frame 500 appropriate to secure and maintain each of retractable seatbelt housings 800 in position during operation of the vehicle 750. Attachment portions 80 thus secure to the vehicle 750 frame 500 in positions devised appropriate for weight bearing and force distribution.

In the example embodiment herein depicted, the medial support member 50 is parallelepiped, horizontally disposed, and includes a horizontal section 52 and an inclined section 54 disposed at the trigon frame member 20 anterior end 22. The inclined section 54 originates along the length of the medial support member 50 at a position laterally proximal the terminus 78 of each of the pair of side support members 70. The inclined section 54 is disposed to orient the central securement plate 60 at an obtuse angle within a plane angled downwards relative the medial support member 50 horizontal section 52. The central securement plate 60 includes a plurality of apertures 62 wherein a pair of bracket members 64 is securable in parallel relation upon an underside of the central securement plate 60. Each of the pair of bracket members 64 is devised to position securably around one of the vehicle 750 support rear cross tubes 504 in a position disposed between each of the retractable seatbelt housings 800. The trigon frame member 20 anterior end 22, therefore, is installable and attachable to the vehicle frame 500 at each attachment portion 80 of each of the pair of side support members 70, disposed to interconnect with the retractable seat belt housing 800 mount holes, and at the central securement plate 60, by interconnection of the pair of bracket members 64 around vehicle support rear cross tube 504. The posterior end 24 is thus maintained nested within the rear frame portion 502, securable to the vehicle frame 500, whereby hitch receiver assembly 200 is securable at the truss apex 30 as will be described subsequently.

The medial support member 50 further includes at least one gusset member 56 vertically disposed upon the inclined section 54 to apically conjunct an adjustable truss rod 90, said truss rod 90 disposed overtop the medial support member 50 and angularly oriented between an anterior pivotal housing 92 atop at least one dorsal gusset member 56 and a posterior pivotal terminus 94 atop the truss apex 30. The adjustable truss rod 90 is threadably engaged interior to said anterior pivotal housing 92 and said posterior pivotal terminus 94 wherein rotation of the adjustable truss rod 90 enables upward and downward play of the trigon frame 20 posterior end 24 when said frame 20 is installed to a vehicle 750, whereby the above-ground height of an interconnected hitch mount 300 is rendered adjustable within a range of positions defined by the length of the adjustable truss rod 90 in threadable engagement within the anterior pivotal housing 92 and posterior pivotal terminus 94.

Hitch receiving assembly 200 includes hitch receiver 204 and dorsal plate member 202. Dorsal plate member 202 is a vertically oriented parallelepiped having topmost edge 206 disposed for insertible seating in between each of the parallel plate members 36 at the truss apex 30. In the embodiment illustrated in FIG. 4, the hitch receiving assembly 200 is a square tube and the dorsal plate member 202 is disposed along a cornerwise edge 210 thereupon. Alignment of a plurality of apertures 208 disposed in the dorsal plate member 202 with each of the connection apertures 34, 36 disposed through each of the pair of parallel plate members 36 in the interconnect truss apex 30 enables secure fastening of the hitch receiver assembly 200 disposed posteriorly projected in a parallel plane underlying the trigon frame member 20 posterior end 24.

The dorsal plate member 202 includes at least one posterior connection aperture 209. When there is more than one posterior connection aperture 209 (see FIG. 4) a user is enabled selective position of the hitch receiver assembly 200 in angled relation relative the trigon frame member 20 posterior end 24, or parallel therewith, as desired, by interconnection of one of the at least one posterior connection apertures 209 with the interconnect truss apex 30. Hitch mount 300 is then securable in hitch receiver 204. In some instances, modification to plastic casing 802 of the vehicle 750 is required, wherein a slot 804 is cut in the casing 802 to accommodate the dorsal plate member 202 of the hitch receiver assembly 200 therethrough. The hitch receiver assembly 200 is thus securable in a plane parallel with longitudinal axes of the trigon frame member 20, yet disposed, by the width of dorsal plate member 202, below the trigon frame member 20 and above the rear wheel.

A drop down mount assembly 400 is also included, connectable at the hitch receiver 204. The drop down mount assembly 400 is configured to position a rear connect plate 408 in position more proximal the ground surface and thereby position the point of tow at a lower center of gravity relative the rear wheel of the three-wheeled vehicle 750. The drop down mount assembly 400 includes a first section 402, connectable to the hitch receiver 204, a second section 404 disposed at an oblique angle endwise upon the first section 402, and a third section 406 disposed at an oblique angle endwise upon the second section 404. The rear connect plate 408 is disposed endwise upon the third section 406 in a plane parallel with the first section 402. A hitch mount 300 is securable through the rear connect plate 408.

Figure 6:
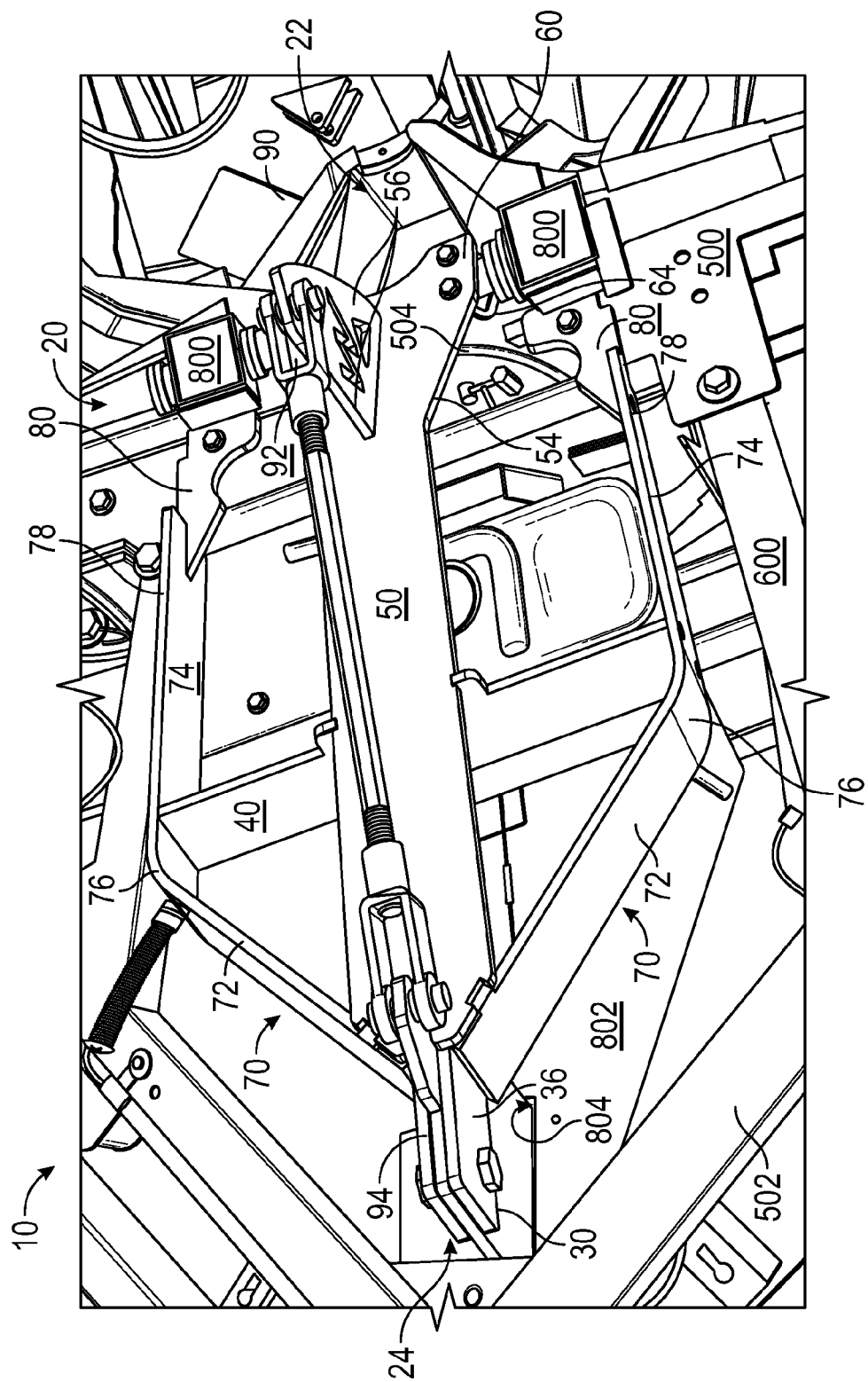
FIG. 6 is an elevation view of an example embodiment of a trigon frame member installed to the frame of a three-wheeled vehicle.
Figure 7:
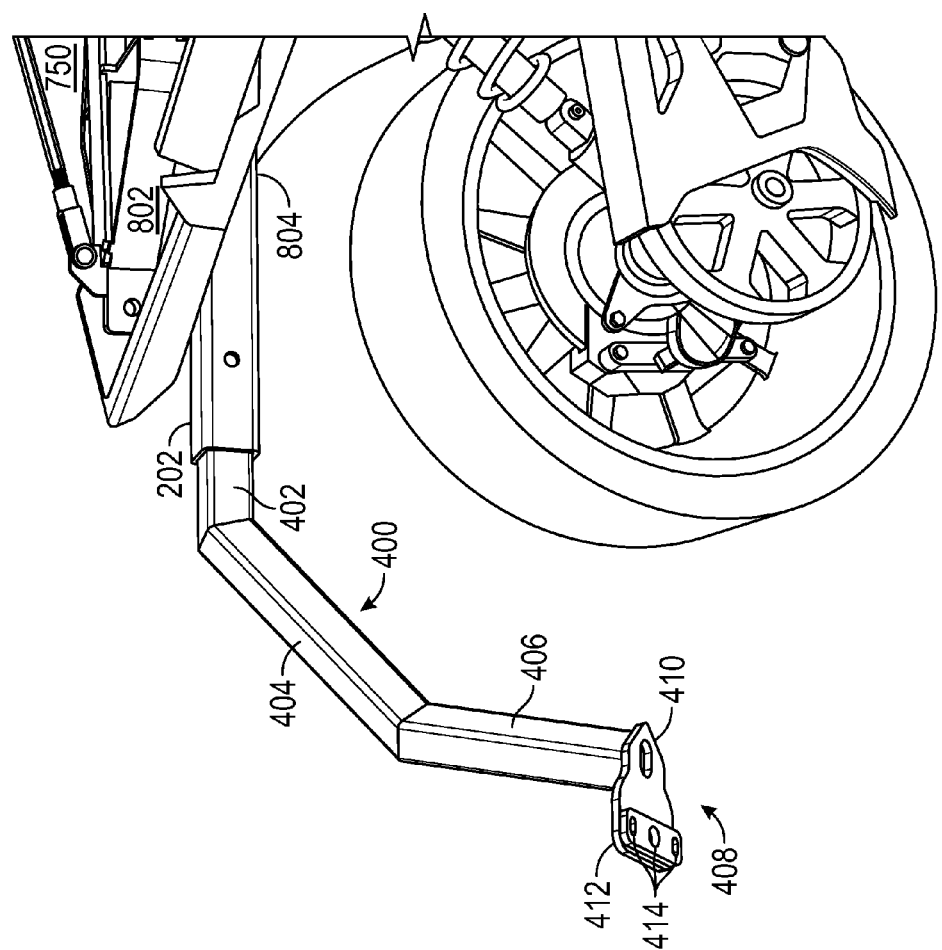
FIG. 7 is a side elevation view of a drop down mount assembly connected to a hitch receiver.

In the embodiment illustrated in FIG. 6, the first 402, second 404, and third sections 406 of the drop down mount assembly 400 are square tubes oriented along the diagonal and the rear connect plate 408 is disposed with a triangular beak 410 connectable endwise upon to the third section 406 of the drop down mount assembly 400. The rear connect plate 408 includes a spatulate head member 412 wherein a plurality of mounting apertures 414 is disposed for interconnection with a hitch mount 300 and, alternatively, for interconnection with structures supported in tow.

Figure 8:
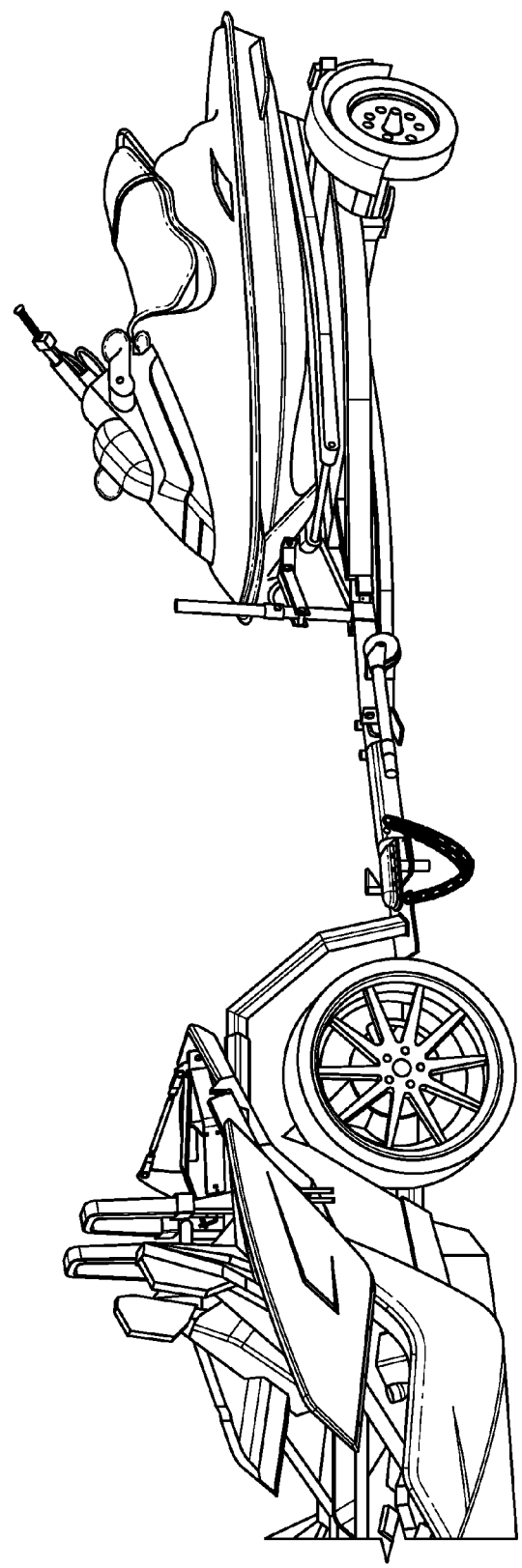
FIG. 8 is an in use view of an example embodiment installed to a three-wheeled vehicle with a drop down mount assembly connected in tow.
Figure 9:
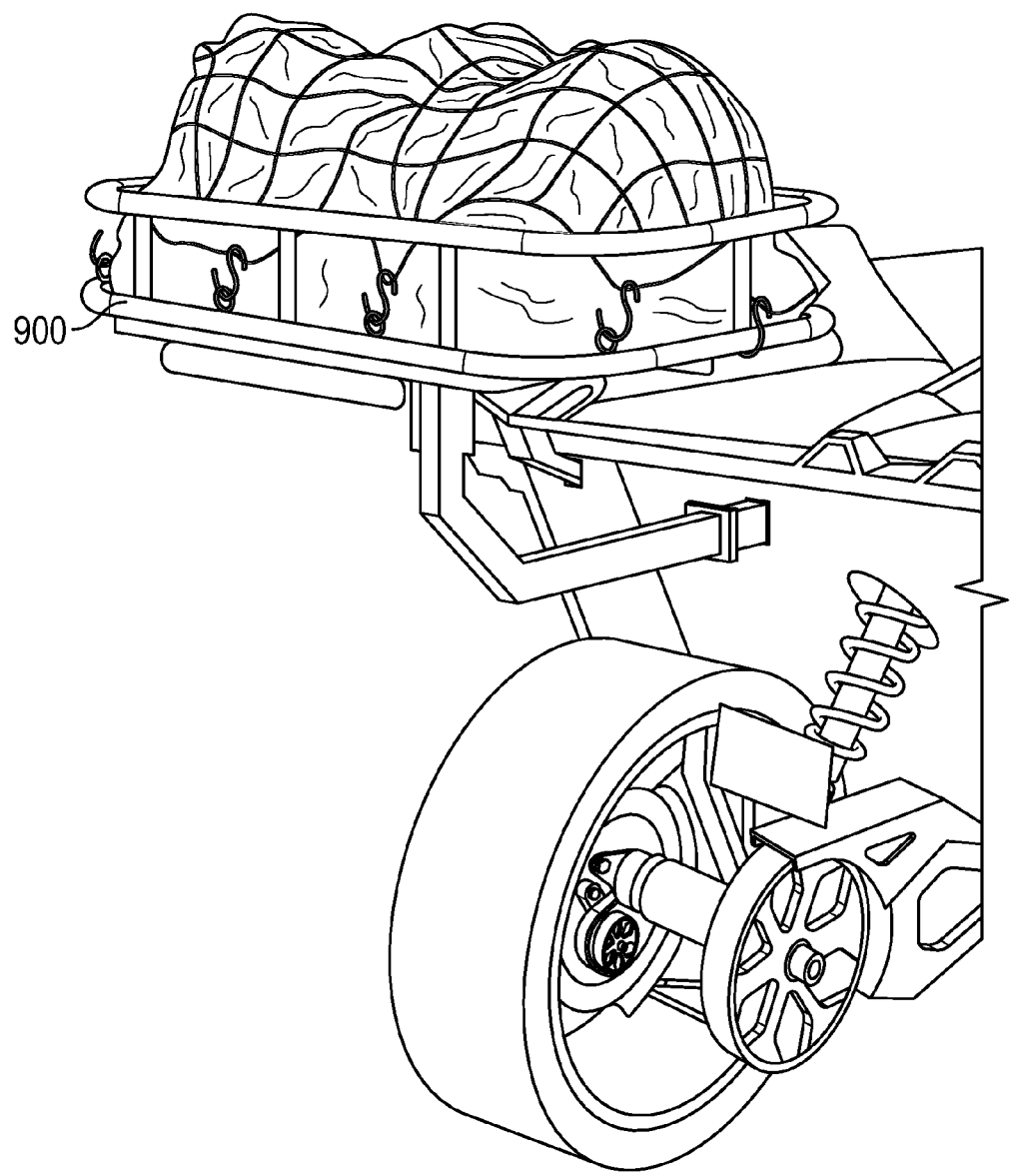
FIG. 9 is an in use view of an example embodiment installed to a three-wheeled vehicle with an upward mount assembly connected supporting a storage platform in tow.
Figure 10:
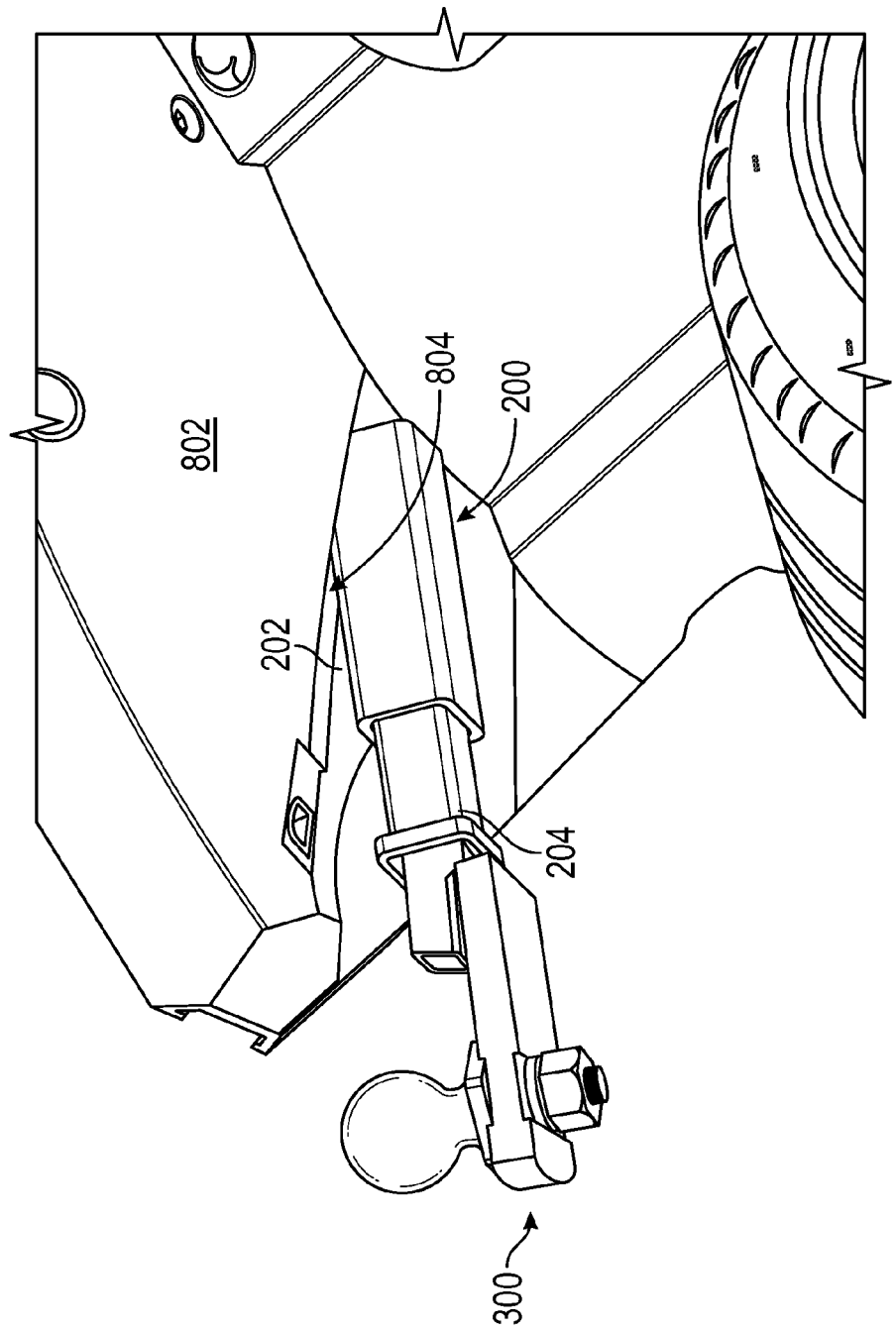
FIG. 10 is a detail view of an example embodiment having a hitch receiver assembly disposed above a single rear wheel of a three-wheeled vehicle.

In the embodiment illustrated in FIG. 8 an upward mount member 450 is illustrated, connectable directly with the hitch receiver assembly 200 to position a storage platform 900 rearwardly of a user operating the three-wheeled vehicle 750 to which the mountable hitch frame assembly for three-wheeled vehicle 10 is attached. Additional embodiments of rearward mounts are contemplated as part of this invention 10 to position objects and structures securely in tow, as desired, with weight distributed into the existing vehicle frame 500 (as shown in FIG. 8, for example).

An accessory bracket member (not shown) may be included for attachment around any frame portion of the vehicle frame which may immediately underlie and contact the trigon frame member 20 when placed in position for installation. Such accessory bracket member (not shown) is therefore positional shielding direct contact between the trigon frame member 20 and any intermediate frame portion of the vehicle not connectable to the trigon frame member 20 that may otherwise be scratched or affected by contact with the trigon frame member 20.

Once installed, mounting of the cowling (not shown) back to the rear frame portion 502 of the vehicle 750 conceals the trigon frame member 20 from view. Towing articles, objects, and trailers is thus enabled by the present invention 10 which demonstrates useful improvements over known prior art in enabling ready installation to an existing three-wheeled vehicle effective for safe towing of articles, objects, and trailers, as desired.

What is claimed is:

1. A mountable hitch frame assembly for three-wheeled vehicle devised for fit within the bounds of an existing rear frame portion of an existing three-wheeled vehicle, comprising a trigon frame member having:
   an anterior end;
   a posterior end;
   a medial support member disposed longitudinally between said anterior and posterior ends, said medial support member attachable endwise to the existing three-wheeled vehicle frame;
   a pair of side support members diverged spaced apart from the posterior end, each of said pair of side support members endwise securable to the existing three-wheeled vehicle frame;
   an interconnect truss apex disposed at the posterior end; and
   a hitch receiver assembly disposed securable to the interconnect truss apex, said hitch receiver assembly disposed to position a hitch receiver rearwardly projected over a rear wheel of the existing three-wheeled vehicle;
   wherein the trigon frame member securably attaches to the existing frame of a three-wheeled vehicle to position the hitch receiver assembly rearwardly projected above a rear wheel swing-arm assembly whereby force and inertia of objects and accessories mounted in tow is distributed directly into the vehicle frame.

2. The mountable hitch frame assembly for three-wheeled vehicle of claim 1 wherein the medial support member further comprises:
   a horizontal section disposed projected frontwards from the posterior end;
   an inclined section disposed frontwards from the horizontal section, said inclined section disposed downwardly relative the horizontal section;
   a central securement plate disposed endwise upon the inclined section, said central securement plate having a plurality of apertures therein; and
   a pair of bracket members disposed securable to the central securement plate, each of said pair of bracket members securable engaged around a support rear cross tube of the existing three-wheeled vehicle frame;
   wherein the medial support member secures the trigon frame member to the rear frame portion of the existing three-wheeled vehicle whereby the inclined section is positionable in a plane parallel with a ground surface and the posterior end is thereby positionable angled relative thereto.

3. The mountable hitch frame assembly for three-wheeled vehicle of claim 2 wherein each of the pair of side support members further comprises:
   an angled section endwise disposed angularly frontwards from the posterior end;
   a primary bend disposed endwise upon the angled section;
   a parallel section disposed endwise upon the angled section and parallel with the medial support member;
   a terminus disposed endwise upon the parallel section; and
   an attachment portion disposed at the terminus;
   wherein each of the pair of side support members is securable to preexisting mounts disposed upon the existing three-wheeled vehicle frame whereat each of a pair of existing retractable seat belt housings is likewise attachable.

4. The mountable hitch frame assembly for three-wheeled vehicle of claim 3 further comprising:
   at least one gusset member disposed atop the inclined section of the medial support member;
   an anterior pivotal housing disposed atop the at least one dorsal gusset member;
   a posterior pivotal terminus disposed atop the interconnect truss apex; and
   an adjustable truss rod rotatably disposed between the anterior pivotal housing and the posterior pivotal terminus;
   wherein rotation of the adjustable truss rod enables upward and downward play of the posterior end relative the anterior end of the trigon frame member.

5. The mountable hitch frame assembly for three-wheeled vehicle of claim 4 wherein the interconnect truss apex further comprises:
   each of a pair of parallel plate members vertically disposed adjacent one another;
   a parallel plate member terminus;
   a proximal aperture; and
   a distal aperture.

6. The mountable hitch frame assembly for three-wheeled vehicle of claim 5 wherein the hitch receiver assembly further comprises a dorsal plate member disposed thereatop, said dorsal plate member having:

a plurality of apertures disposed for selective alignment with the proximal and distal apertures in the internet truss apex; and a top edge disposed to seat in between each of the parallel plate members of the interconnect truss apex;

wherein the hitch receiver assembly is positionably securable into the interconnect truss apex.

7. The mountable hitch frame assembly for three-wheeled vehicle of claim 6 wherein the trigon frame member further comprises a transverse support member disposed transversely between the anterior end and the posterior end underlying the medial support member endwise conjunct each of the pair of side support members.

8. A mountable hitch frame assembly for three-wheeled vehicle comprising:

a trigon frame member disposed for connection to at least a portion of an existing frame of a three-wheeled vehicle above an existing rear wheel swing-arm assembly of said three-wheeled vehicle, said trigon frame member including:
an anterior end;
a posterior end;
a medial support member longitudinally disposed between the anterior end and the posterior end;
a pair of side support members angularly divergent from the posterior end, each of said side support members having an angled section angularly disposed coplanar from the posterior end and a parallel section disposed parallel the medial support member;
at least one dorsal gusset member upwardly disposed atop the medial support member;
an anterior pivotal housing disposed atop the at least one dorsal gusset member;
a posterior pivotal terminus disposed atop the posterior end;
an adjustable truss rod rotatably disposed between the anterior pivotal housing and the posterior pivotal housing;
an interconnect truss apex disposed at the posterior end; and
a hitch receiver assembly securable to the interconnect truss apex, said hitch receiver assembly securable to position a hitch receiver rearwardly projected therefrom;

wherein the trigon frame member securably attaches to the existing frame of a three-wheeled vehicle to position the hitch receiver assembly rearwardly projected above a rear wheel swing-arm assembly whereby force and inertia of objects and accessories mounted in tow is distributed directly into the vehicle frame.

9. The mountable hitch frame assembly for three-wheeled vehicle of claim 8 wherein the medial support member further comprises:

a horizontal section coplanar with each of the pair of side support members;
an inclined section angularly disposed downwardly relative the horizontal section;
a central securement plate disposed endwise upon the inclined section; and
a pair of bracket members securable to the central securement plate around at least a portion of the existing frame of the existing three-wheeled vehicle.

10. The mountable hitch frame assembly for three-wheeled vehicle of claim 8 wherein each of the pair of side support members further comprises:

a primary bend disposed between the angled section and the parallel section;
a terminus disposed endwise upon the parallel section;
an attachment portion disposed at the terminus, said attachment portion securable to the existing three-wheeled vehicle frame.

11. The mountable hitch frame assembly for three-wheeled vehicle of claim 9 wherein the pair of brackets secure engaged around a support rear cross tube of the existing three-wheeled vehicle frame.

12. The mountable hitch frame assembly for three-wheeled vehicle of claim 10 wherein the attachment portion attaches to preexisting mounts whereat each of an existing pair of retractable seatbelt housings is securably attachable.

13. A mountable hitch frame assembly for three-wheeled vehicle comprising:

a trigon frame member disposed for connection above an existing rear wheel swing-arm assembly of a three-wheeled vehicle, said trigon frame member having:
an anterior end;
a posterior end;
a transverse support member disposed transversely between the anterior end and the posterior end;
a vertically disposed interconnect truss apex disposed at the posterior end, said interconnect truss apex including:
a pair of parallel plate members, each of said pair of parallel plate members vertically disposed longitudinally adjacent each other between the posterior end and the transverse support member;
a proximal connection aperture;
a distal connection aperture;
a terminus disposed conjunct the transverse support member;
a medial support member disposed atop the pair of parallel plate members and projected forwardly overtop the transverse support member from the posterior end to the anterior end, said medial support member having:
a horizontal section disposed coplanar the anterior and posterior ends;
an inclined section disposed angularly declined relative the horizontal section;
a central securement plate disposed endwise upon the inclined section;
a pair of bracket members securable to the central securement plate around an existing support rear cross tube of the existing three-wheeled vehicle frame;
each of a pair of side support members disposed divergently frontwards from the interconnect truss apex towards the anterior end, each of said pair of side support members comprising:
an angled section disposed angularly frontwards from the interconnect truss apex;
a primary bend disposed endwise upon the angled section, said primary bend disposed proximal the transverse support member;
a parallel section disposed endwise at the primary bend, said parallel section disposed in parallel with the medial support member;
a terminus endwise bounding the parallel section;
an attachment portion disposed at the terminus, said attachment portion disposed appropriate to attach to the existing three-wheeled vehicle frame whereat an existing pair of retractable seat belt housings attach;
at least one dorsal gusset member upwardly disposed proximal the anterior end upon the inclined section of the medial support member;

an anterior pivotal housing disposed atop the at least one dorsal gusset member;

a posterior pivotal terminus disposed proximal the posterior end upon the horizontal section of the medial support member;

an adjustable truss rod rotatably disposed between the anterior pivotal housing and the posterior pivotal housing, said adjustable truss rod rotatable to effect upward and downward play of the posterior end relative the anterior end;

a hitch receiver assembly disposed for interconnection at the vertically disposed interconnect truss apex, said hitch receiver assembly comprising:

a dorsal plate member disposed for sliding engagement in between each of the pair of parallel plate members;

a plurality of apertures disposed transversely through the dorsal plate member, each of said plurality of apertures alignable with the proximal connection aperture and the distal connection aperture disposed in the interconnect truss apex to positionably orient the hitch receiver assembly relative an underlying round surface; and a hitch receiver disposed rearwardly projected edgewise from the dorsal plate member;

wherein the trigon frame member securably attaches to the existing frame of a three-wheeled vehicle to position the hitch receiver assembly rearwardly projected above a rear wheel swing-arm assembly whereby force and inertia of objects and accessories mounted in tow is distributed directly into the vehicle frame.

* * * * *